United States Patent
Sakurai

(10) Patent No.: US 11,543,595 B2
(45) Date of Patent: Jan. 3, 2023

(54) OPTICAL DEVICE

(71) Applicant: Santec Corporation, Aichi (JP)

(72) Inventor: Yasuki Sakurai, Aichi (JP)

(73) Assignee: Santec Corporation, Aichi (JP)

( * ) Notice: Subject to any disclaimer, the term of this patent is extended or adjusted under 35 U.S.C. 154(b) by 105 days.

(21) Appl. No.: 17/217,232

(22) Filed: Mar. 30, 2021

(65) Prior Publication Data

US 2022/0229239 A1    Jul. 21, 2022

(30) Foreign Application Priority Data

Jan. 15, 2021    (JP) ............................. JP2021-005258

(51) Int. Cl.
| | |
|---|---|
| *G02B 6/35* | (2006.01) |
| *H04B 10/61* | (2013.01) |
| *H04B 10/50* | (2013.01) |
| *H04B 10/572* | (2013.01) |
| *G02B 6/293* | (2006.01) |
| *H04Q 11/00* | (2006.01) |

(52) U.S. Cl.
CPC ........... *G02B 6/356* (2013.01); *G02B 6/2938* (2013.01); *G02B 6/3518* (2013.01); *H04B 10/506* (2013.01); *H04B 10/572* (2013.01); *H04B 10/614* (2013.01); *H04Q 2011/0026* (2013.01); *H04Q 2011/0032* (2013.01); *H04Q 2011/0035* (2013.01)

(58) Field of Classification Search
CPC .................. G02B 6/356; G02B 6/2938; G02B 6/3518; H04B 10/506; H04B 10/572; H04B 10/614; H04Q 2011/0026; H04Q 2011/0032; H04Q 2011/0035
See application file for complete search history.

(56) References Cited

U.S. PATENT DOCUMENTS 6,978,061 B1 * 12/2005 Tabuchi ................ G02B 6/356
                                                                385/16

FOREIGN PATENT DOCUMENTS

| CN | 1769944 A | * | 5/2006 | ......... H04Q 11/0005 |
| JP | 2015-156015 A | | 8/2015 | |

* cited by examiner

*Primary Examiner* — Leslie C Pascal
(74) *Attorney, Agent, or Firm* — Osha Bergman Watanabe & Burton LLP

(57) ABSTRACT

An optical device includes: wavelength selection elements; an optical switch that switches a propagation path of input light that is from an input port such that the input light propagates to one designated wavelength selection element among the wavelength selection elements; and a separation element disposed in the propagation path of the input light between the input port and the wavelength selection elements and that separates the input light into wavelength components.

7 Claims, 8 Drawing Sheets

OPTICAL DEVICE

CROSS-REFERENCE TO RELATED APPLICATIONS

This application claims priority from Japanese patent application No. 2021-005258 filed Jan. 15, 20201. This reference is incorporated herein by reference in its entirety.

TECHNICAL FIELD

The present invention relates to an optical device.

BACKGROUND

WDM networks, which are communications networks using wavelength division multiplex (WDM) optical communications art, are known. Branch points of WDM networks are provided with an OADM (optical add-drop multiplexer) enabling branching/inserting optical signals.

Integration of a wavelength selective switch (WSS: wavelength selective switch) into terrestrial systems of WDM networks as a component of an ROADM (reconfigurable optical add-drop multiplexer), which is a reconfigurable OADM, is proceeding (see patent document 1). The wavelength selection switch includes, for example, an MEMS mirror and spatial optical system electrically controlled by a controller and is configured to transmit an optical signal of any wavelength to any path.

However, there are significant barriers to integrating WSS into WDM network systems. In recent years, the number of optical submarine cable fiber pairs has been increasing in response to a marked increase in demand for data communications capacity. In accordance with this increase in the number of fiber pairs, a large number of WSSs is required to integrate WSS as a component of ROADM.

However, an ROADM including a WSS is more expensive than an OADM (see FIG. 11), which has a bandpass filter and coupler conventionally adopted in submarine systems as components. In addition, a WSS has a high power consumption and a high failure rate due to electrically driven mobile elements, such as an MEMS mirror.

Maintenance costs of submarine systems are much higher than that of terrestrial systems due to the peculiarity of the installation location thereof. Therefore, when integrating a WSS, which has a high failure rate, into a submarine system, the WSS must be installed redundantly for system reliability.

As mentioned above, a WSS is an expensive optical device, and thus the redundant WSS installation incurs significant WSS integration costs in submarine systems. In addition, it is not easy to increase power supply at the sea floor. Therefore, it is difficult to integrate a large number of WSSs, which have high power consumption, into a submarine system.

On the other hand, an OADM using a bandpass filter and coupler conventionally used in a submarine system is a non-reconfigurable OADM configured only from passive optical components, and the add (add) and drop (drop) operations of the WDM signal can be performed only for predetermined wavelengths. That is, a conventional OADM has no degree of freedom in wavelength selection.

PATENT LITERATURE

[Patent Document 1] JP 2015-156015 A

SUMMARY

One or more embodiments of the present invention provide a new optical device suitable for the integration of an ROADM into a submarine system.

An optical device according to one or more embodiments of the present invention is provided with a plurality of wavelength selection elements, an optical switch, and a separation element.

The optical switch is configured to switch a propagation path of input light from an input port such that the input light propagates to one designated wavelength selection element among the plurality of wavelength selection elements. The separation element is provided in the propagation path of the input light between the input port and the plurality of wavelength selection elements and is configured to separate the input light into a plurality of wavelength components.

Each of the plurality of wavelength selection elements is configured to propagate a group of wavelength components corresponding to a first wavelength band among the plurality of wavelength components from the incoming input light separated by the separation element to a first output path optically coupled to a first output port, and propagate a group of wavelength components corresponding to a second wavelength band different from the first wavelength band to a second output path optically coupled to a second output port.

Specifically, each of the plurality of wavelength selection elements is configured as an optical element designed such that combinations of the first wavelength band and the second wavelength band are different between the wavelength selection elements.

According to this optical device, although the degree of freedom in wavelength selection is lower than that of a WSS, input light can be branched in different wavelength selection patterns by selecting a wavelength selection element via the optical switch. That is, the optical device according to one or more embodiments of the present invention is superior in terms of the degree of freedom of selection of wavelength compared to a conventional OADM, which has no freedom of selection.

Furthermore, according to the optical device according to one or more embodiments of the present invention, in comparison to a WSS, complicated and expensive mobile element are not required, and thus an inexpensive ROADM having a low failure rate can be configured. Therefore, according to one or more embodiments of the present invention, it is possible to provide a new optical device suitable for the integration of an ROADM into a submarine system.

According to one or more embodiments of the present invention, the optical switch may be a latch-type optical switch. Although a latch-type optical switch requires power for switching an optical path, it does not require power to maintain the optical path.

Therefore, according to the optical device provided with the latch-type optical switch, it is possible to configure an ROADM having lower power consumption than a WSS. Therefore, this optical device is suitable for use in a submarine system having limited power supply.

According to one or more embodiments of the present invention, the separation element can be configured from a diffraction grating. According to one or more embodiments of the present invention, each of the plurality of wavelength selection elements may be provided with a first mirror and a second mirror. The first mirror is positioned in the propagation path of the group of wavelength components corresponding to the first wavelength band of the incoming input light, and the second mirror may be positioned in the propagation path of the group of wavelength components corresponding to the second wavelength band of the incoming input light.

The first mirror may have a reflective surface angled so as to reflect the group of wavelength components corresponding to the first wavelength band toward the first output path. The second mirror may have a reflective surface angled so as to reflect the group of wavelength components corresponding to the second wavelength band toward the second output path. According to such a wavelength selection element, optical branching can be realized by a simple optical system without electric mobile element.

According to one or more embodiments of the present invention, each of the plurality of wavelength selection elements may be provided with a first diffraction grating and a second diffraction grating The first diffraction grating is positioned in the propagation path of the group of wavelength components corresponding to the first wavelength band of the incoming input light, and the second diffraction grating may be positioned in the propagation path of the group of wavelength components corresponding to the second wavelength band of the incoming input light.

The first diffraction grating may be a reflective diffraction grating having a diffraction grating period set such that the group of wavelength components corresponding to the first wavelength band is reflected toward the first output path. The second diffraction grating may be a reflective diffraction grating having a diffraction grating period set such that the group of wavelength components corresponding to the second wavelength band is reflected toward the second output path. According to such a wavelength selection element as well, optical branching can be realized by a simple optical system without electric mobile element.

According to one or more embodiments of the present invention, the plurality of wavelength components may be linearly polarized light polarized in a first direction. In this case, each of the plurality of wavelength selection elements may include a first reflection element, a second reflection element, a birefringent crystal, and a ½ waveplate.

The first reflection element may be positioned in the propagation path of the group of wavelength components corresponding to the first wavelength band of the incoming input light, and the second reflection element may be positioned in the propagation path of the group of wavelength components corresponding to the second wavelength band of the incoming input light.

The first reflection element includes a ¼ waveplate on a reflective surface and may be configured to reflect the group of wavelength components corresponding to the first wavelength band as linearly polarized light polarized in a second direction orthogonal to the first direction by rotation in polarization direction.

The second reflection element includes an optical path length correction plate having an optical path length corresponding to a ¼ waveplate on a reflective surface and may be configured to reflect the group of wavelength components corresponding to the second wavelength band as linearly polarized light polarized in the first direction.

The birefringent crystal may be configured such that the group of wavelength components corresponding to the first wavelength band as linearly polarized light polarized in the second direction from the first reflection element is refracted toward the first output path and the group of wavelength components corresponding to the second wavelength band as linearly polarized light polarized in the first direction from the second reflection element is refracted toward the second output path.

The ½ waveplate may be provided in the first output path. The optical device may be configured such that the group of wavelength components corresponding to the first wavelength band propagating along the first output path propagates to the first output port as linearly polarized light polarized in the first direction by rotation in the ½ waveplate. According to such a wavelength selection element as well, optical branching can be realized without electric mobile element.

According to one or more embodiments of the present invention, the optical device may be configured for optical communications at the sea floor.

DETAILED DESCRIPTION

Exemplary embodiments of the present invention will be described below with reference to drawings. Optical devices 100 and 200 according to exemplary embodiments of the present invention are optical devices suited for an ROADM 10 of a WDM network, particularly for an ROADM 10 for a submarine system.

Figure 1:
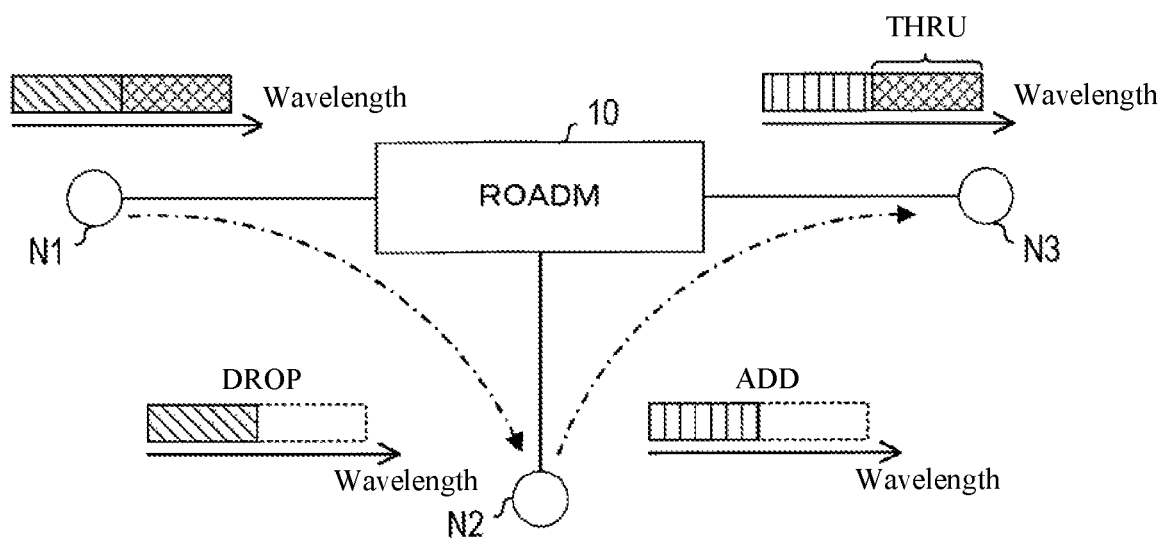
FIG. 1 is a diagram describing operation of an ROADM.

The ROADM 10 is provided at a branch point of the WDM network and performs optical signal branching/insertion. According to the WDM network exemplified in FIG. 1, a first communication node N1, a second communication node N2, and a third communication node N3 are connected via the ROADM 10.

Optical communication between the first communication node N1 and the second communication node N2 is performed via a first channel corresponding to a first wavelength band, and optical communication between the first communication node N1 and the third communication node N3 is performed via a second channel corresponding to a second wavelength band.

In a process for transmitting an optical signal from the first communication node N1 to the third communication node N3, the ROADM 10 drops (DROP) a signal component of the first channel included in the optical signal and transmits it to the second communication node N2. A signal component of the second channel is passed through (THRU) and transmitted to the third communication node N3.

The ROADM 10 adds (ADD) the signal component of the first channel from the second communication node N2 to an optical signal from the first communication node N1, from which the signal component of the first channel was dropped, and transmits it to the third communication node N3.

The optical devices 100 and 200 according to exemplary embodiments of the present invention are configured to output a wavelength component of a first wavelength band among input light from an input port Pi via a first output port Po1 and to output a wavelength component of a second wavelength band via a second output port Po2. The optical devices 100 and 200 may be used to branch input light in the ROADM 10.

First Embodiment

The configuration of the optical device 100 in a first embodiment will be described below using FIG. 2. Specific examples of components used in the optical device 100 are described in the subsequent second to fourth embodiments.

Figure 2:
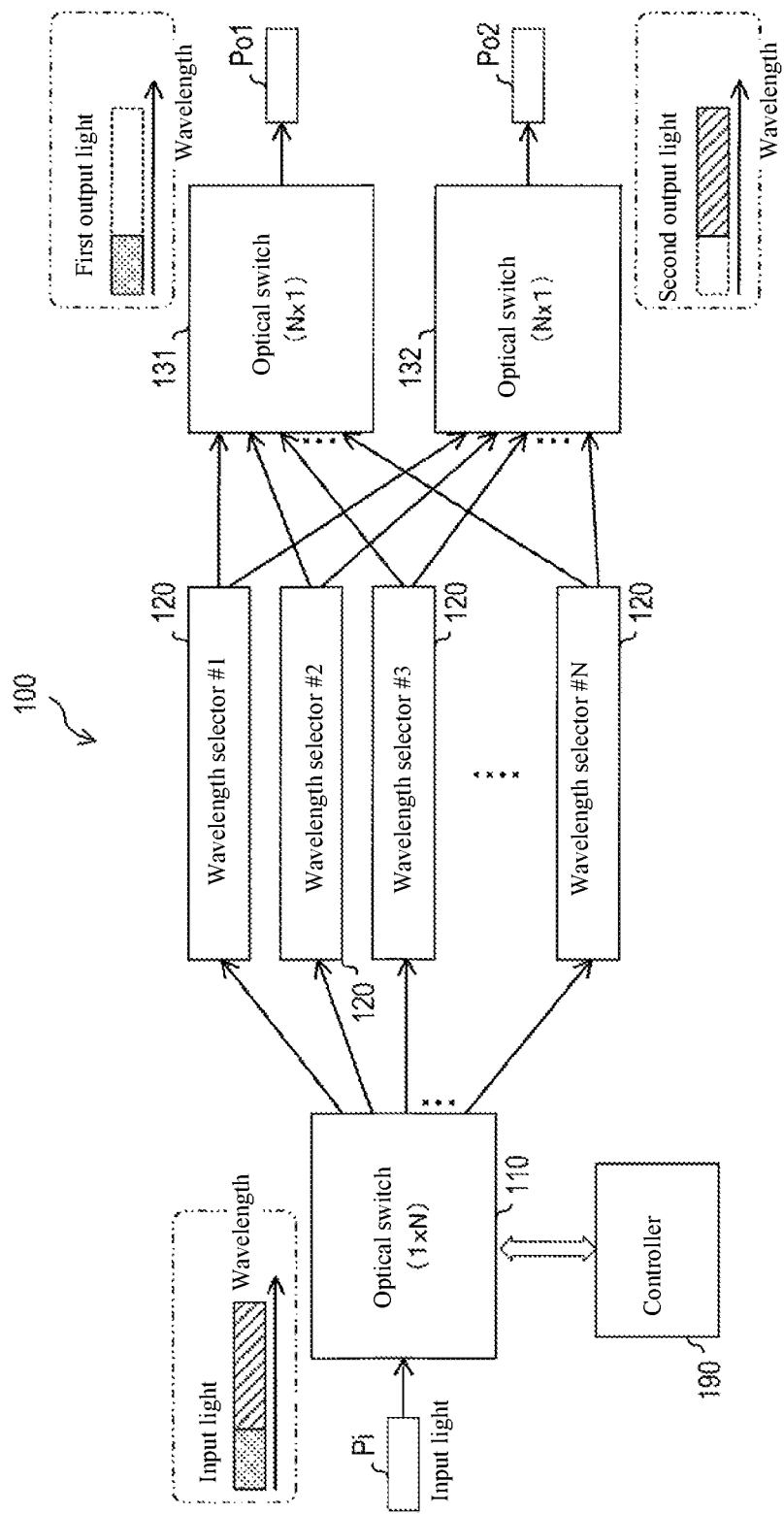
FIG. 2 is a block diagram representing a configuration of the optical device of a first embodiment.

The optical device 100 illustrated in FIG. 2 is a one-input, two-output optical device and is provided with an input side optical switch 110 for receiving input light from an input port Pi, a plurality of wavelength selectors 120, a first output side optical switch 131 optically coupled to a first output port Po1, and a second output side optical switch 132 optically coupled to a second output port Po2.

The optical switch 110 is configured to switch a propagation path of the input light such that the input light propagates to one designated optical path among a plurality of optical paths. The designation is performed, for example, via a controller 190. That is, the optical switch 110 may be configured to switch the propagation path of the input light according to a control signal from the controller 190.

The optical switch 110 is configured as a latch-type optical switch. An optical switch utilizing a magnetic optical effect and an electromagnetic relay type optical switch are known as latch-type optical switches.

According to the latch-type optical switch, energization is required only when the optical path is switched, and energization is not required at other times, and thus power consumption of the optical device 100 can be suppressed in comparison with the non-latch type.

The wavelength selector 120 is provided on each of a plurality of optical paths switchable by the optical switch 110. N illustrated in FIG. 2 corresponds to the number of switchable optical paths, and #1, #2, . . . , #N correspond to optical path numbers.

Each wavelength selector 120 is an optical element designed and arranged such that a wavelength component of a first wavelength band included in input light propagating along a corresponding optical path is propagated to the first output side optical switch 131 and a wavelength component of a second wavelength band different from the first wavelength band included in the input light is propagated to the second output side optical switch 132.

A combination of the first and second wavelength bands (hereinafter referred to as a wavelength selection pattern) is different for each wavelength selector 120. Each wavelength selector 120 has no mobile elements for changing the wavelength selection pattern. The wavelength selection pattern in each wavelength selector 120 is static, not variable, and is structurally determined by the optical design of the corresponding wavelength selector 120.

That is, each wavelength selector 120 wavelength-separates the input light by a static spatial optical system having no mobile elements, propagates the wavelength component of the first wavelength band determined by the design of the optical system to the optical switch 131, and propagates the wavelength component of the second wavelength band to the optical switch 132.

Figure 3:
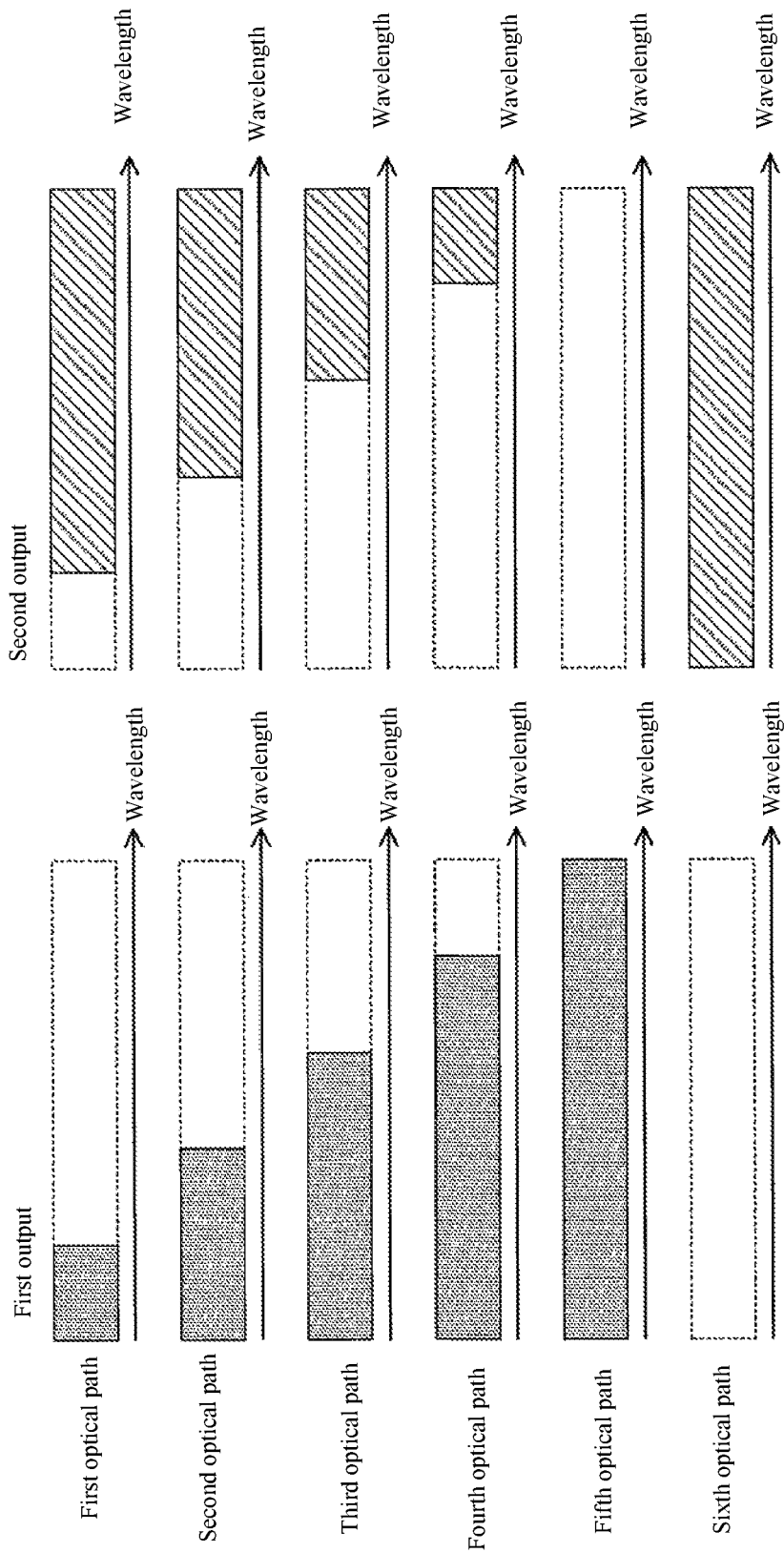
FIG. 3 is a diagram describing a wavelength selection pattern.

FIG. 3 illustrates an example of a wavelength selection pattern. According to this example, the number N of optical paths to be switched by the optical switch 110 is six, and when the first optical path is selected by the optical switch 110, via the wavelength selector 120 (#1) of the first optical path, the wavelength component of, for example, a 20% wavelength band on the short wavelength side among the whole band of the input light is transmitted to the optical switch 131 as the wavelength component of the first wavelength band, and the wavelength component of the remaining 80% wavelength band is transmitted to the optical switch 132 as the wavelength component of the second wavelength band.

When the second optical path is selected, the wavelength component of for, example, a 40% wavelength band on the short wavelength side is transmitted to the optical switch 131 as the first wavelength band via the wavelength selector 120 (#2) of the second optical path, and the wavelength component of the remaining 60% wavelength band is transmitted to the optical switch 132 as the second wavelength band.

The wavelength component of the entire band of the input light is transmitted to the optical switch 131 via the wavelength selector 120 (#5) of a fifth optical path, and no wavelength component of any wavelength band of the input light is transmitted to the optical switch 132. Conversely to the fifth optical path, the wavelength component of the entire band of the input light is transmitted to the optical switch 132 via the wavelength selector 120 (#6) of a sixth optical path as the second wavelength band, and no wavelength component of any wavelength band of the input light is transmitted to the optical switch 131.

The optical switches 131 and 132 are configured as latch-type optical switches, similarly to the optical switch 110, and switch the optical path on the input side so as to select the same optical path as the optical path selected by the optical switch 110. That is, the optical switch 131 outputs the wavelength component of the first wavelength band inputted via the wavelength selector 120 of the optical path selected by the optical switch 110 to the first output port Po1, and the optical switch 132 outputs the wavelength component of the second wavelength band inputted via the wavelength selector 120 of the same optical path to the second output port Po2.

According to this optical device 100, a wavelength selection pattern is switched at a degree of freedom corresponding to the number of wavelength selectors 120 prepared in advance, and an optical signal from the input port Pi is divided into signal components of two wavelength bands, in other words, signals of two WDM channel groups, and can be outputted from the first and second output ports Po1 and Po2, which are the two corresponding output ports.

The optical device 100 has only the latch-type optical switches 110, 131, and 132 as electrically driven mobile elements, as described above. Therefore, according to this optical device 100, power consumption related to switching and maintaining the wavelength selection pattern is low.

Furthermore, although the optical device 100 is inferior compared to a WSS in terms of the degree of freedom in wavelength selection, it has an internal structure including simpler mobile elements than a WSS, and thus the optical device 100 can operate more stably than a WSS, has a low failure rate, and can realize highly reliable operation for a long time.

Therefore, the optical device 100 of the present embodiment is suited for the ROADM 10 in a WDM network, particularly the ROADM 10 for a submarine system requiring low power consumption and high reliability.

The optical device 100 of the present embodiment does not include parts such as an MEMS mirror and an LCOS and, significantly, can also be manufactured at lower cost than a WSS. A one-input, two-output optical device 100 is described above, but it is needless to say that the optical device 100 may be modified to include three or more output ports.

Second Embodiment

Figure 4:
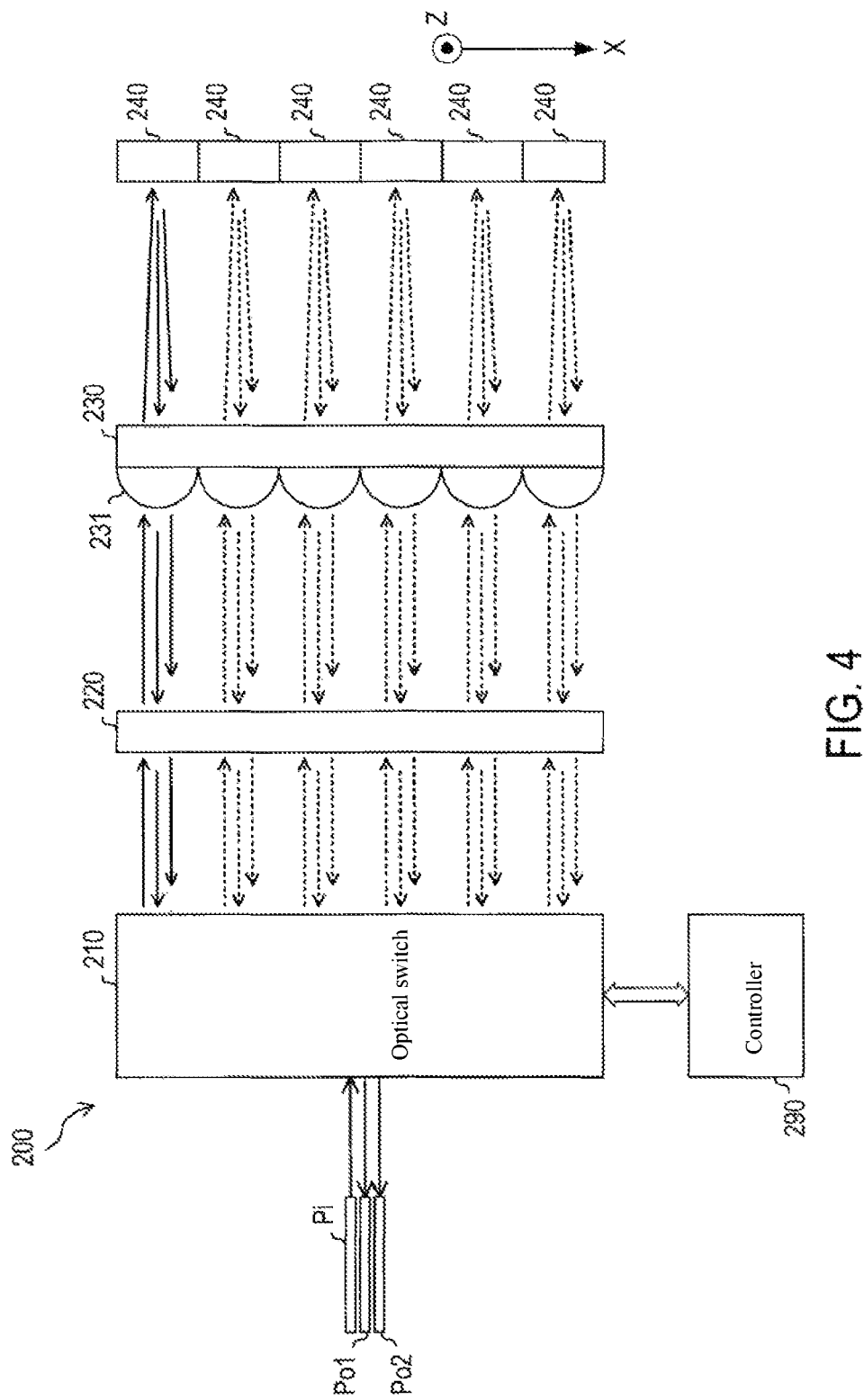
FIG. 4 is a block diagram representing a configuration of the optical device of a second embodiment.

The optical device 200 of a second embodiment realizes a function equivalent to the optical device 100 of the first embodiment by an optical system illustrated in FIG. 4.

The optical device 200 of the present embodiment is provided with an optical switch 210, a transmissive diffraction grating 220, a lens array 230, and a plurality of wavelength selection elements 240.

The optical switch 210 is configured to optically couple the input port Pi, the first output port Po1 and the second output port Po2 to one designated wavelength selection element 240 among the plurality of wavelength selection elements 240. The designation is performed, for example, via a controller 290. The input port Pi, the first output port Po1, and the second output port Po2 may be provided with corresponding optical fibers.

The optical switch 210 corresponds to the optical switches 110, 131, and 132 in the first embodiment. The optical switch 210 is configured as a latch-type optical switch which does not require energization to maintain an optical path, similarly to the first embodiment.

Input light inputted from the input port Pi into the optical switch 210 propagates along an optical path corresponding to a designated wavelength selection element 240 among a plurality of optical paths corresponding to the plurality of wavelength selection elements 240 and propagates through a transmissive diffraction grating 220 on the optical path and a lens array 230 to the designated wavelength selection element 240.

Figure 5:
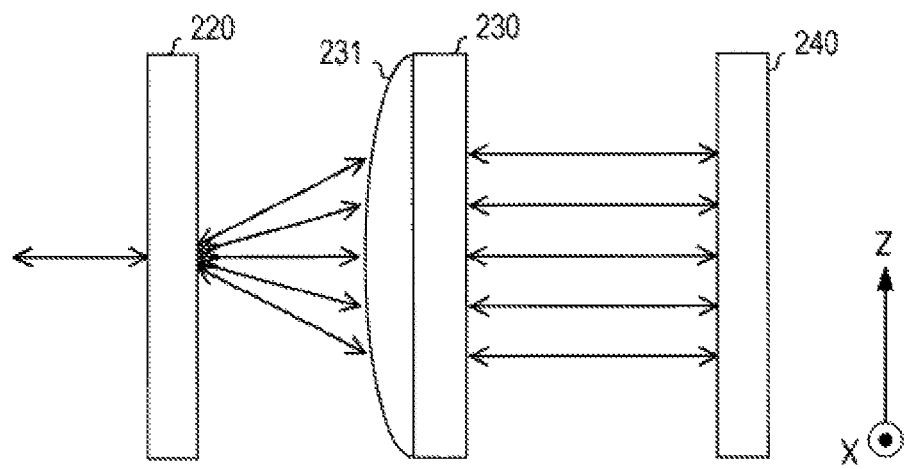
FIG. 5 is a diagram illustrating input light wavelength-dispersed by a transmissive diffraction grating.

As illustrated in FIG. 5, the transmissive diffraction grating 220 wavelength-disperses the input light coming from the optical switch 210. That is, the transmissive diffraction grating 220 spatially separates a plurality of wavelength components included in the input light.

A plurality of arrows extending from the transmissive diffraction grating 220 illustrated in FIG. 5 conceptually indicate that input light is wavelength-distributed and propagates to the lens array 230. As can be understood from the illustration of a Z direction in FIG. 4 and FIG. 5, the input light is spatially separated into a plurality of wavelength components in the Z direction corresponding to a direction normal to the paper surface illustrated in FIG. 4.

The input light separated into the plurality of wavelength components is condensed by a lens 231 of a corresponding optical path provided in the lens array 230 and focuses on the one designated wavelength selection element 240.

Each wavelength selection element 240 is configured to reflect the input light in a plurality of directions according to the wavelength band such that each of the plurality of wavelength components of the input light is outputted from the corresponding output port.

Figure 6:
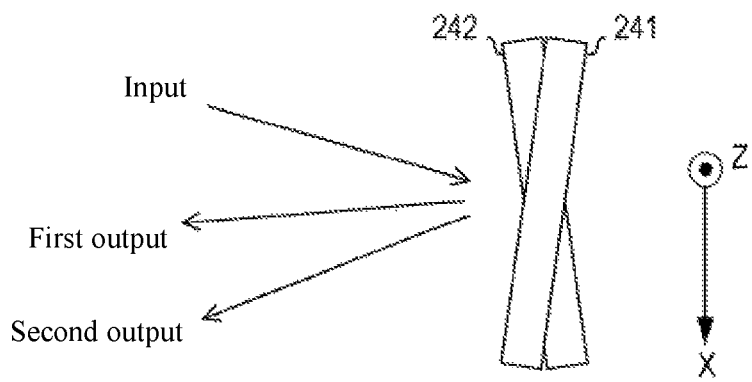
FIG. 6 is a diagram illustrating a configuration of the wavelength selection element according to the second embodiment.

According to the present embodiment, each wavelength selection element 240 is configured by arranging mirrors for each output port along the Z direction which is the direction of dispersion of the input light by the transmissive diffraction grating 220. As illustrated in FIG. 6, the wavelength selection element 240 of the present embodiment is provided with a first mirror 241 corresponding to the first output port Po1 and a second mirror 242 corresponding to the second output port Po2.

The first mirror 241 has a reflective surface angled such that the wavelength component of the first wavelength band among the incoming wavelength-dispersed input light is reflected on a first output path optically coupled to the first output port Po1. The first mirror 241 is disposed such that the reflective surface is positioned in a region where, among the wavelength-dispersed input light, the wavelength component of the first wavelength band arrives.

The second mirror 242 has a reflective surface angled such that the wavelength component of the second wavelength band among the incoming wavelength-dispersed input light is reflected on a second output path optically coupled to the second output port Po2. The second mirror 242 is disposed such that the reflective surface is positioned in a region where, among the wavelength-dispersed input light, the wavelength component of the second wavelength band arrives.

Thus, due to having reflective surface of different angles, the wavelength selection element 240 is configured such that the input light is reflected in different directions between the first wavelength band and the second wavelength band, and the input light is optically coupled to a different output port for each wavelength band Similarly to the first embodiment, each of the plurality of wavelength selection elements 240 is designed such that combinations of the first wavelength band and the second wavelength band, that is, wavelength selection patterns, are different between the wavelength selection elements 240. That is, each of the wavelength selection elements 240 is designed such that the arrangement of the first mirror 241 and the second mirror 242 is different between the wavelength selection elements 240, and is disposed within the optical device 200.

For example, six wavelength selection elements 240 corresponding to the first to sixth optical paths illustrated in FIG. 4 may be configured to reflect the wavelength components of the first and second wavelength bands included in the input light toward the first output port Po1 and the second output port Po2 in the wavelength selection pattern illustrated in FIG. 3.

Each of a first output light, which is the wavelength component of the first wavelength band reflected by the wavelength selection element 240, and a second output light, which is the wavelength component of the second wavelength band, while spatially separated in an X direction orthogonal to the Z direction, propagates along a return path corresponding to an outbound path of the input light, passes through the optical switch 210, and is outputted from the corresponding output port.

According to the optical device 200 of the embodiment described above, similarly to the first embodiment, mobile elements are provided only for the latch-type optical switch 210. Therefore, similarly to the optical device 100 of the first embodiment, the optical device 200 of the present embodiment is suited for an ROADM 10 in a WDM network, particularly an ROADM 10 for a submarine system requiring low power consumption and high reliability.

In the optical device 200 of the present embodiment, the optical switch 210 may be realized by a multi-stage configuration of an optical switch for two-path switching. Furthermore, the optical device 200 may be configured as an optical device having three or more output ports.

In this case, the wavelength selection element 240 may be provided with M or more mirrors corresponding to a number M of output ports and may be configured to reflect wavelength components of first, second, third, . . . , Mth wavelength bands toward corresponding output ports using corresponding mirrors.

Third Embodiment

The optical device 200 of a third embodiment is configured such that, in the optical device 200 of the second embodiment, the wavelength selection element 240 is replaced by a wavelength selection element 340 having a different structure. A configuration of the wavelength selection element 340 will be selectively described below as a configuration of the optical device 200 of the third embodiment.

Components in the optical device 200 of the third embodiment that are common to the second embodiment are given the same reference numerals and are omitted from description. Unless otherwise described, components given the same reference numerals may be understood as being the same components as the second embodiment.

Figure 7A:
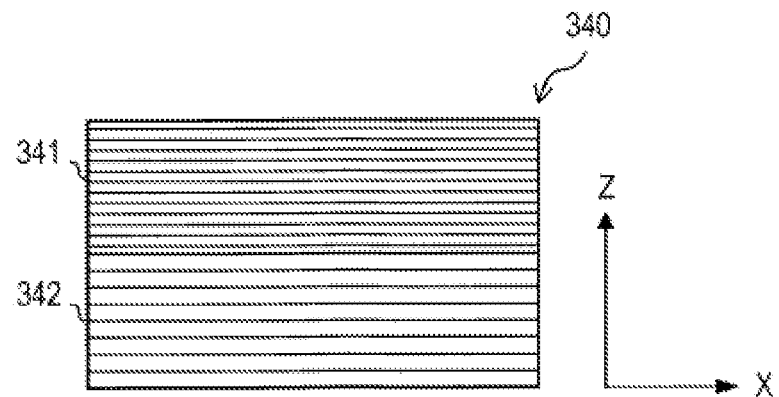
FIG. 7A is a diagram illustrating a configuration of the wavelength selection element according to a third embodiment.

As illustrated in FIG. 7A, the wavelength selection element 340 of the present embodiment is configured by arranging a plurality of reflective diffraction gratings 341 and 342 having different diffraction grating periods, in other words, grating pitches along a direction of dispersion (Z direction) of the input light by the transmissive diffraction grating 220.

The reflection angle with respect to an incident angle of light incident on the reflective diffraction gratings is determined by the wavelength and the diffraction grating period. In the present embodiment, this is utilized to reflect the input light a different direction for each wavelength band and optically couple the reflected light to a different output port for each wavelength band.

A first reflective diffraction grating 341 among the plurality of reflective diffraction gratings 341 and 342 is disposed in a region where, among the wavelength-dispersed input light, the wavelength component of the first wavelength band arrives. A second reflective diffraction grating 342 is disposed in a region where, among the wavelength-dispersed input light, the wavelength component of the second wavelength band arrives.

Figure 7B:
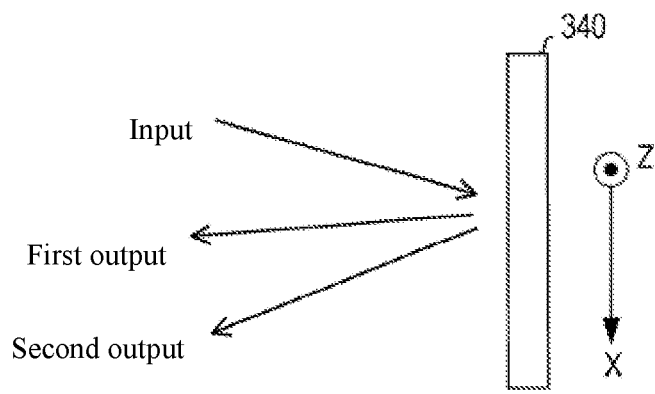
FIG. 7B is a diagram describing the mode of propagation of input light reflected in different directions in each wavelength band from the wavelength selection element due to differences in diffraction grating period.

Due to the diffraction grating period of the first reflective diffraction grating 341 and the diffraction grating period of the second reflective diffraction grating 342 differing, as illustrated in FIG. 7B, among the incoming wavelength-dispersed input light, the wavelength selection element 340 reflects the wavelength component of the first wavelength band toward the first output path optically coupled to the first output port Po1 and reflects the wavelength component of the second wavelength band toward the second output path optically coupled to the second output port Po2.

That is, among the incoming wavelength-dispersed input light, the first reflective diffraction grating 341 is configured such that the diffraction grating period is set so as to reflect the wavelength component of the first wavelength band toward the first output path. Among the incoming wavelength-dispersed input light, the second reflective diffraction grating 342 is configured such that the diffraction grating period is set so as to reflect the wavelength component of the second wavelength band toward the second output path.

In this embodiment as well, there are no mobile elements in the wavelength selection element 340. In light of this, the optical device 200 of the present embodiment is also suited for a ROADM10 for a submarine system requiring low power consumption and high reliability.

Fourth Embodiment

The optical device 200 of a fourth embodiment is configured such that, in the optical device 200 of the second embodiment, the wavelength selection element 240 is replaced by a wavelength selection element 440 for propagating the input light in a different direction for each wavelength band using birefringence.

A configuration which is different from that of the optical device 200 in the second embodiment will be selectively described below as a configuration of the optical device 200 of the fourth embodiment. Components in the optical device 200 of the fourth embodiment that are common to the second embodiment are given the same reference numerals and are omitted from description. Unless otherwise described, components given the same reference numerals may be understood as being the same components as the second embodiment.

Figure 8A:
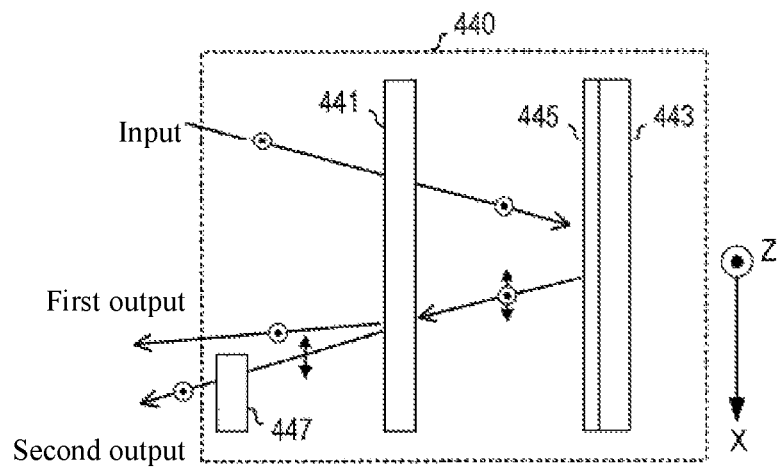
FIG. 8A is a diagram illustrating a configuration of the wavelength selection element according to a fourth embodiment.
Figure 8B:
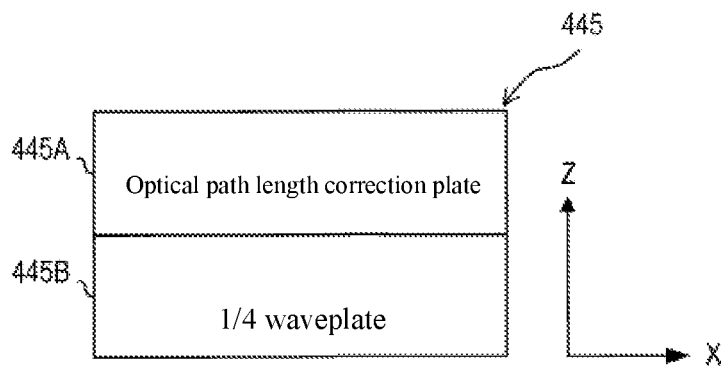
FIG. 8B is a diagram describing the arrangement of the optical path correction plate and ¼ waveplate configuring the wavelength selection element.

As illustrated in FIG. 8A, the wavelength selection element 440 of the present embodiment is provided with a birefringent crystal 441, a mirror 443, an adjustment plate 445 on the mirror 443, and a ½ waveplate 447. The adjustment plate 445 is provided with an optical path length correction plate 445A on the mirror 443, being arranged in the direction of dispersion (Z direction illustrated in FIG. 8A and FIG. 8B) of the input light, and a ¼ waveplate 445B.

The optical path length correction plate 445A is provided in a region on the mirror 443 where, among the wavelength-dispersed input light, the wavelength component of the first wavelength band arrives, and the ¼ waveplate 445B is provided in a region on the mirror 443 where, among the wavelength-dispersed input light, the wavelength component of the second wavelength band arrives.

According to the present embodiment, the input light inputted into the wavelength selection element 440 is converted into linearly polarized light polarized in one direction (Z direction) upstream of the input light. The input light converted into linearly polarized light is reflected by the mirror 443 through the birefringent crystal 441 and the adjustment plate 445 and again propagates to the birefringent crystal 441 through the adjustment plate 445.

The wavelength component of the second wavelength band is rotated by 90° to pass through the ¼ waveplate 445B before and after reflection by the mirror 443. Thereby, the wavelength component of the second wavelength band reflected by the mirror 443 is converted from linearly polarized light polarized in the first direction from before reaching the adjustment plate 445 to linearly polarized light polarized in a second direction orthogonal to the first direction and propagates to the birefringent crystal 441.

On the other hand, the wavelength component of the first wavelength band reflected by the mirror 443 propagates to the birefringent crystal 441 through the optical path length correction plate 445A before and after reflection. The optical path length correction plate 445A is provided to align the optical path lengths before and after reflection between the wavelength component of the first wavelength band passing through the optical path length correction plate 445A and the wavelength component of the second wavelength band passing through the ¼ waveplate 445B.

Differently from the wavelength component of the second wavelength band, the wavelength component of the first wavelength band reflected by the mirror 443 is not rotated 90° and propagates to the birefringent crystal 441 while still being the linearly polarized light polarized in the first direction from before reaching the regulating plate 445.

In the birefringent crystal 441, each wavelength component of the first wavelength band and the wavelength component of the second wavelength band is refracted at a different angle due to differences in polarization direction and passes through the birefringent crystal 441. Specifically, in the birefringent crystal 441, the wavelength component of the first wavelength band is refracted so as to propagate along the first output path optically coupled to the first output port Po1, and the wavelength component of the second wavelength band is refracted so as to propagate along the second output path optically coupled to the second output port Po2.

The ½ waveplate 447 is provided in the second output path, rotates the wavelength component of the second wavelength band polarized in the second direction 90°, and outputs it as the wavelength component of the second wavelength band polarized in the first direction.

Thereby, each of the first output light, which is the wavelength component of the first wavelength band, and the second output light, which is the wavelength component of the second wavelength band, while spatially separated in an X direction orthogonal to the Z direction, propagates along a return path corresponding to an outbound path of the input light, passes through the optical switch 210, and is outputted from the corresponding output port among the first and second output ports Po1 and Po2.

Figure 9:
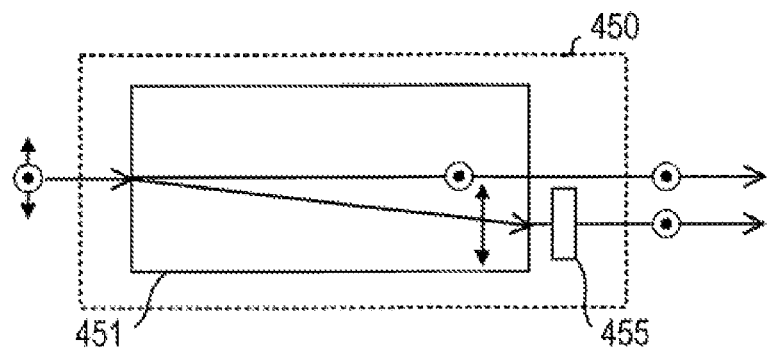
FIG. 9 is a diagram illustrating a configuration of a conversion element for converting input light into linearly polarized light.

In the present embodiment, the conversion of the input light into linearly polarized light described above is realized by a conversion element 450 illustrated in FIG. 9. The conversion element 450 is disposed in a propagation path of the input light to the wavelength selection element 440, which is upstream of the wavelength selection element 440.

The conversion element 450 is provided with a birefringent crystal 451 and a ½ waveplate 455. The birefringent crystal 451 separates the input light into first and second linearly polarized lights orthogonal to each other. The ½ waveplate 455 is provided in a path in which, among the first and second linearly polarized lights, the second linearly polarized light propagates from the birefringent crystal 451 and rotates the second linearly polarized light 90°. Due to this rotation, the second linearly polarized light is converted into linearly polarized light having the same polarization state as the first linearly polarized light. The conversion element 450 thus converts the input light into linearly polarized light polarized in one direction.

According to this embodiment as well, similarly to the second and third embodiments, it is possible to configure an optical device suitable for an ROADM10 for a submarine system, having low cost, low failure rate, and high reliability.

[Advantages of Wavelength Selection Using Spatial Optical System]

Figure 10A:
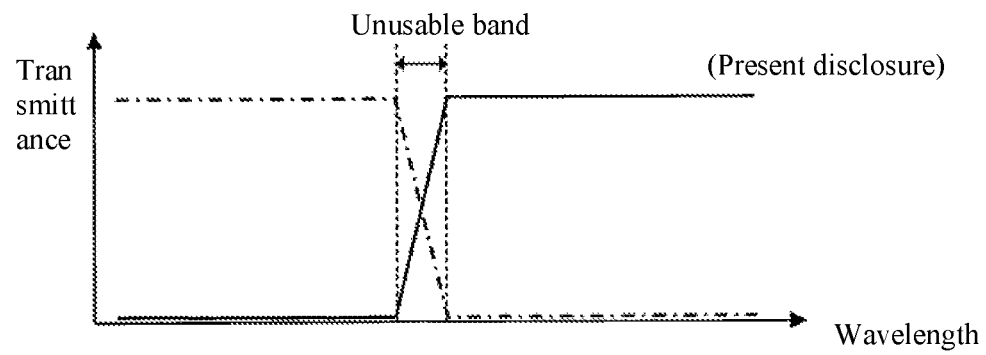
FIG. 10A is a graph illustrating light transmission characteristics of each output port of the optical device.

According to the first to fourth embodiments described above, the optical devices 100 and 200 select a wavelength by using a spatial optical system and selectively output the optical component of the corresponding wavelength band to each output port. As illustrated in FIG. 10A, according to wavelength selection using such a spatial optical system, it is possible to realize a filter shape having a steep edge, and it is possible to reduce the unusable band in optical communications.

FIG. 10A illustrates transmission characteristics of an optical signal branched by the optical devices 100 and 200 using a spatial optical system to the first and second output ports Po1 and Po2. The graph illustrated in FIG. 10A illustrates wavelength on the horizontal axis and transmittance on the vertical axis.

Figure 10B:
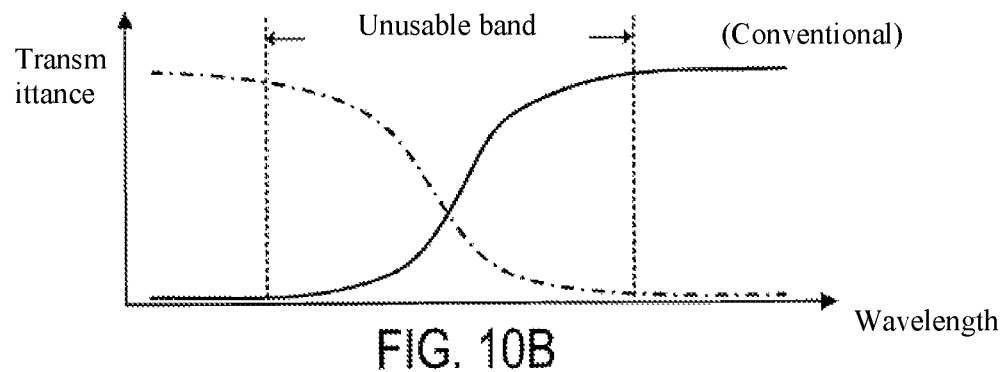
FIG. 10B is a graph illustrating light transmission characteristics in an OADM according to conventional art.
Figure 11:
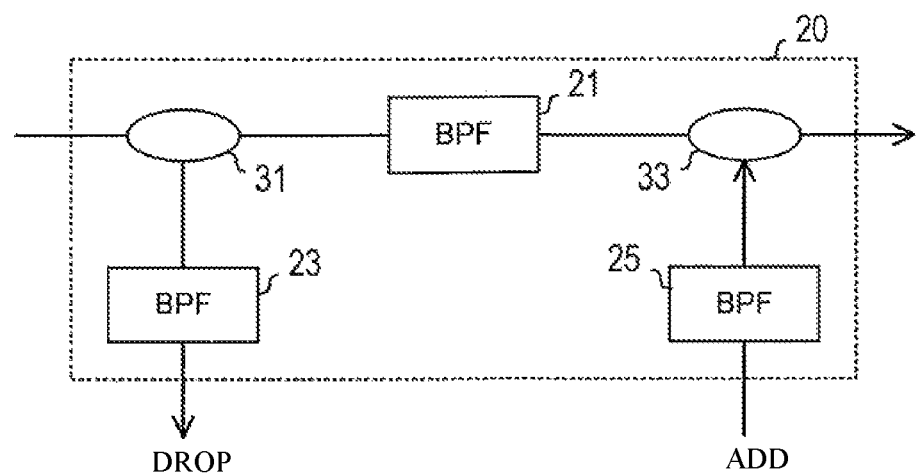
FIG. 11 is a diagram illustrating a configuration of an OADM according to conventional art.

The graph illustrated in FIG. 10B illustrates transmission characteristics of an optical signal to first and second output ports in a conventional OADM. The conventional OADM here is an OADM 20 illustrated in FIG. 11 for a submarine system, being provided with bandpass filters 21, 23, and 25 and 3 dB couplers 31 and 33.

According to the conventional OADM, the failure rate is extremely low because the entirety is configured using passive optical parts, but it has a disadvantage in that loss is high due to passing through the 3 dB couplers 31 and 33 and a disadvantage in that the selected wavelength cannot be changed. Furthermore, the bandpass filters 21, 23, and 25 are configured using, for example, a multilayer film filter and an FBG (fiber Bragg grating), and the slope of the filter edges is gentle, and thus there is a wide unusable band that cannot be used for communication generated at the boundary of the branched wavelengths.

According to the optical devices 100 and 200 of the first to fourth embodiments, the unusable band can be reduced, as described above. Furthermore, although the optical devices 100 and 200 of the foregoing embodiments have a low degree of freedom compared to a WSS, the mobile elements are simple, and they can constitute an ROADM10 suitable for a submarine system having a low failure rate and high reliability.

[Other]

The present invention is not limited to the exemplary embodiments described above, and it is needless to say that various modes can be adopted. For example, the optical devices 100 and 200 may be used for applications other than an ROADM.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

100 . . . optical device,
110, 131, 132 . . . optical switch,
120 . . . wavelength selector,
200 . . . optical device,
210 . . . optical switch,
220 . . . transmissive diffraction grating, 230 . . . lens array,
240 . . . wavelength selection element,
241 . . . first mirror,
242 . . . second mirror,
340 . . . wavelength selection element,
341, 342 . . . reflective diffraction grating,
440 . . . wavelength selection element,
441 . . . birefringent crystal,
443 . . . mirror,
445 . . . adjustment plate,
445A . . . optical path length correction plate,
445B . . . ¼ waveplate,
447 . . . ½ waveplate,
450 . . . conversion element,
451 . . . birefringent crystal,
455 . . . ½ waveplate,
Pi . . . input port,
Po1, Po2 . . . output port.

What is claimed is:

1. An optical device, comprising:
wavelength selection elements; and
an optical switch that switches a propagation path of input light from an input port such that the input light propagates to one designated wavelength selection element among the wavelength selection elements, wherein,
each of the wavelength selection elements is an optical element that separates the input light into wavelength components and propagates, among the wavelength components separated from the input light,
a first group of wavelength components corresponding to a first wavelength band to a first output path optically coupled to a first output port, and
a second group of wavelength components corresponding to a second wavelength band different from the first wavelength band to a second output path optically coupled to a second output port, and
combinations of the first wavelength band and the second wavelength band are different among the wavelength selection elements.

2. The optical device according to claim 1, wherein the optical switch is a latch-type optical switch.

3. The optical device according to claim 1, further comprising a transmissive diffraction grating between the optical switch and each of the wavelength selection elements.

4. The optical device according to claim 1, wherein each of the wavelength selection elements comprises:
a first mirror in a propagation path of the first group of wavelength components; and
a second mirror in a propagation path of the second group of wavelength components,
the first mirror comprises a reflective surface that is angled and reflects the first group of wavelength components toward the first output path, and
the second mirror comprises a reflective surface that is angled and reflects the second group of wavelength components toward the second output path.

5. The optical device according to claim 1, wherein each of the wavelength selection elements comprises:
a first diffraction grating in a propagation path of the first group of wavelength components; and
a second diffraction grating in a propagation path of the second group of wavelength components;
the first diffraction grating is a first reflective diffraction grating having a first diffraction grating period set such that the first group of wavelength components is reflected toward the first output path; and
the second diffraction grating is a second reflective diffraction grating having a second diffraction grating period set such that the second group of wavelength components is reflected toward the second output path.

6. The optical device according to claim 1, wherein
the wavelength components are linearly polarized in a first direction;
each of the wavelength selection elements comprises:
a first reflection element in a propagation path of the first group of wavelength components;
a second reflection element in a propagation path of the second group of wavelength components;
a birefringent crystal; and
a ½ waveplate,
the first reflection element
comprises a ¼ waveplate on a reflective surface, and
reflects the first group of wavelength components as a light that is linearly polarized in a second direction orthogonal to the first direction by rotation in polarization direction,
the second reflection element
comprises an optical path length correction plate on a reflective surface, wherein the optical path length correction plate has an optical path length that corresponds to the ¼ waveplate, and
reflects the second group of wavelength components as a light that is linearly polarized in the first direction,
the birefringent crystal
refracts the first group of wavelength components reflected from the first reflection element toward the first output path, and
refracts the second group of wavelength components reflected from the second reflection element toward the second output path,
the ½ waveplate is disposed in the first output path, and
the first group of wavelength components propagating along the first output path propagates to the first output port as a light linearly polarized in the first direction by rotation in the ½ waveplate.

7. The optical device according to claim 1, wherein the optical device is used in optical communications at a sea floor.

* * * * *